Patented Feb. 27, 1934

1,948,517

UNITED STATES PATENT OFFICE 1,948,517

TREATMENT OF DERIVATIVES OF CELLULOSE

Camille Dreyfus, New York, N. Y., and George Schneider, Montclair, N. J., assignors to Celanese Corporation of America, a corporation of Delaware No Drawing. Application May 10, 1930
Serial No. 451,509

6 Claims. (Cl. 260—102)

This invention relates to the treatment of derivatives of cellulose and relates more particularly to the treatment of organic derivatives of cellulose to reduce their color and increase their clarity characteristics.

An object of our invention is to treat derivatives of cellulose, particularly organic derivatives of cellulose, with oxidizing agents to improve their properties. Another object of our invention is to treat organic derivatives of cellulose with solutions of hypochlorites at elevated temperatures whereby their color is reduced and/or their clarity is increased. Other objects of our invention will appear from the following detailed description.

Organic derivatives of cellulose, such as cellulose acetate, as ordinarily made contain certain colored constituents or ingredients that tend to impair their usefulness in the making of plastics, films and the like, particularly where transparency and freedom of color are desired. Thus if a thick sheet or block of a plastic composition containing such derivatives of cellulose is made, the same has a distinct greenish brown color and is of poor transparency.

We have found that if derivatives of cellulose and particularly organic derivatives of cellulose are subjected to the action of a hypochlorite at elevated temperatures, a large proportion of the color imparting constituents as well as the opacity causing ingredients are either destroyed or are converted into compounds of reduced color and opacity.

In accordance with our invention we prepare derivatives of cellulose of reduced color and capable of producing products of greater transparency by subjecting the same to the action of a bleaching agent comprising a hypochlorite or other chlorine liberating material at elevated temperatures.

While other derivatives of cellulose such as cellulose nitrate may be treated in accordance with our invention, we prefer to treat organic derivatives of cellulose such as organic esters of cellulose and cellulose ethers. Examples of organic esters of cellulose are cellulose acetate, cellulose formate, cellulose propionate and cellulose butyrate while examples of cellulose ethers are ethyl cellulose, methyl cellulose and benzyl cellulose.

Although we have found that the derivatives of cellulose may be subjected to the solution of the hypochlorite by adding the same while dry to such solution, we prefer to treat the derivative of cellulose in a wet condition. Thus cellulose acetate, after it has been precipitated from the solution in which it is formed and thoroughly washed, may be subjected, without intermediate drying, to the solution of the hypochlorite. In this manner better penetration into the cellulose acetate of the hypochlorite solution is attained, and thus local over-oxidation of the cellulose particles is avoided.

Any suitable hypochlorite may be employed in our invention, examples of which are the hypochlorites of sodium, potassium, calcium or magnesium. The hypochlorite is applied preferably in an aqueous solution of suitable concentration and the time of treatment is as required, say from less than 1/4 hour to 3 hours or more, depending on the concentration of the hypochlorite solution, the relative amount of the same to the cellulose derivative, and the condition of the cellulose derivative. In order to effect a rapid and high degree of bleaching, the temperature of treatment is from 50° to 100° C. The use of elevated temperatures is important as not only is the time of treatment reduced, but results are obtained that are not attainable at lower temperatures of treatment.

The derivative of cellulose when treated by our process forms plastics, yarn and the like of greater brilliancy, clarity and freedom of color, than may be made of the untreated derivative of cellulose. It is eminently suited for making clear plastics that have no pigments or dyes, or for the making of light colored plastics. However, the derivative of cellulose purified by our process may be employed for making dark colored materials.

The derivative of cellulose treated in accordance with our invention may be associated with volatile solvents and plastifiers, such as triacetin, diethyl tartrate, dibutyl tartrate, diethyl phthalate, triphenyl phosphate, etc., by known processes, to form plastic sheets, blocks, tubes, rods or articles by any suitable process. Another important application of this invention is in the making of molding powder containing the purified derivative of cellulose in finely divided condition in association with plastifiers but containing little or substantially no volatile solvents, which may be molded under heat and pressure to desired shape. Films to be employed as a base for photographic or cinematographic films or for other purposes may also be made from this material. The purified derivative of cellulose may be also used for making lacquers, particularly clear or light colored lacquers, artificial yarns, etc.

In order further to illustrate our invention but without being limited thereto, the following specific example is given.

*Example I*

Cellulose acetate is formed by the acetylation of cellulose with acetic anhydride in the presence of glacial acetic acid as a solvent and a suitable catalyst such as sulfuric acid. The solution formed after acetylation either with or without treatments, such as ripening wherein the cellulose acetate is hydrolized to impart desired solubility characteristics, is then precipitated by the addition of a large amount of water. The precipitated cellulose acetate, after washing and/or any other desired treatment but without intermediate drying, is treated by subjecting the same to a solution of hypochlorite. The proportions may be as follows:

| | Parts by weight |
|---|---|
| Cellulose acetate | 100 |
| Water | 4000 |
| Sodium hypochlorite having available chlorine in amounts of | 2 |

The temperature of treatment is 80° to 100° C and the time of treatment is one hour.

After the treatment, the cellulose acetate is separated from the solution of the hypochlorite and is washed four or five times until free of chlorine and is then dried.

The cellulose acetate as treated in the foregoing example has its color greatly reduced, and when made into plastics, films, lacquers, yarn and the like, as above described, produces products of greatly reduced color and increased brilliancy and transparency.

It is to be understood that the foregoing detailed description is given merely by way of illustration and that many variations may be made therein without departing from the spirit of our invention.

Having described our invention, what we claim and desire to secure by Letters Patent is:

1. Method of improving the properties of an organic substitution derivative of cellulose comprising treating the same directly after precipitation with a solution capable of liberating chlorine at temperatures above 50° C.

2. Method of improving the properties of cellulose acetate comprising treating the same directly after precipitation with a solution capable of liberating chlorine at temperatures above 50° C.

3. Method of treating an organic substitution derivative of cellulose comprising treating the organic derivative of cellulose directly after precipitation with a solution of a hypochlorite at temperatures above 50° C.

4. Method of treating cellulose acetate comprising treating the cellulose acetate directly after precipitation with a solution of a hypochlorite at temperatures above 50° C.

5. Method of reducing the color of cellulose acetate comprising subjecting the same after it has been precipitated from the solution in which it has been formed, but without prior drying, to an aqueous solution capable of liberating chlorine at temperatures between 80° and 100° C.

6. Method of reducing the color of cellulose acetate comprising subjecting the same after it has been precipitated from the solution in which it has been formed, but without prior drying, to an aqueous solution of sodium hypochlorite at temperatures above 50° C.

CAMILLE DREYFUS.
GEORGE SCHNEIDER.